United States Patent
Lin et al.

(12) United States Patent
(10) Patent No.: US 6,373,495 B1
(45) Date of Patent: Apr. 16, 2002

(54) APPARATUS AND METHOD FOR TEXTURE MAPPING USING MULTIPLE LEVELS OF DETAIL

(75) Inventors: Ming-Fen Lin, Taipei; Tung-Chieh Tsai, Tainan; Hsiang-Chi Lin, Taipei, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/333,567

(22) Filed: Jun. 21, 1999

(30) Foreign Application Priority Data

Mar. 26, 1999 (TW) .......................... 88104780 A

(51) Int. Cl.$^7$ ..................... G06T 11/40; G06T 17/00
(52) U.S. Cl. ................. 345/582; 345/428; 345/601
(58) Field of Search ............................... 345/428, 430, 345/582, 586, 587

(56) References Cited

U.S. PATENT DOCUMENTS 5,953,015 A * 9/1999 Choi ........................ 345/430
6,078,335 A * 6/2000 Wong et al. ............... 345/430
6,100,898 A * 8/2000 Malamy et al. ............ 345/430

* cited by examiner

Primary Examiner—Jeffery Brier
Assistant Examiner—Ryan Yang

(57) ABSTRACT

Texture mapping of a primitive object uses multiple levels of detail. The primitive object is a triangle having three vertices. The pixel coordinates of the three vertices and their corresponding texture mapped coordinates satisfy three linear equations derived from the equation representing the plane on which the triangle belongs to. An equivalent formula derived from a standard formula for the multiple levels of detail can be computed by a plurality of constants forming the three linear equations. The plurality of constants are first determined by using the pixel coordinates and the corresponding texture mapped coordinates of the three vertices. By substituting the constants into the equivalent formula, the value for the multiple levels of detail can be computed. A lookup table is used to determine $\log_2$ function values that are required in the equivalent formula. The method can be realized by simple hardware and a high precision $\log_2$ lookup table to accomplish high quality texture mapping.

6 Claims, 7 Drawing Sheets

---

301 — The available $(X_1, Y_1, S_1, T_1, W_1)$, $(X_2, Y_2, S_2, T_2, W_2)$ and $(X_3, Y_3, S_3, T_3, W_3)$ for the three vertices of the triangle are used to solve equations(2)-(4) and determine the constants $A_{SOW}, B_{SOW}, A_{TOW}, B_{TOW}, A_{OOW}$ and $B_{OOW}$ 302 — Eq.(1) is converted to an equivalent formula for the multiple levels of detail shown in Eq.(5) by means of the relationship between the partial differentials of the texture mapping (S, T) relative to the (X, Y) coordinate and the equations(2)-(4)

303 — Finding the $\log_2$ function from a look-up table as shown in FIG. 4

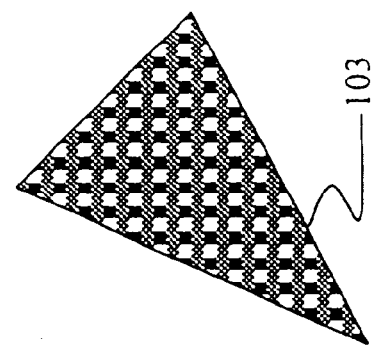
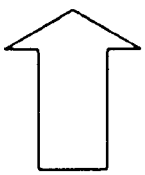
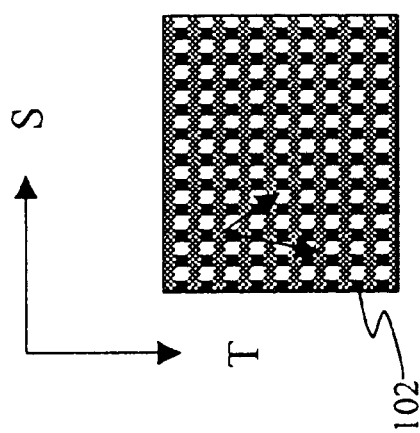
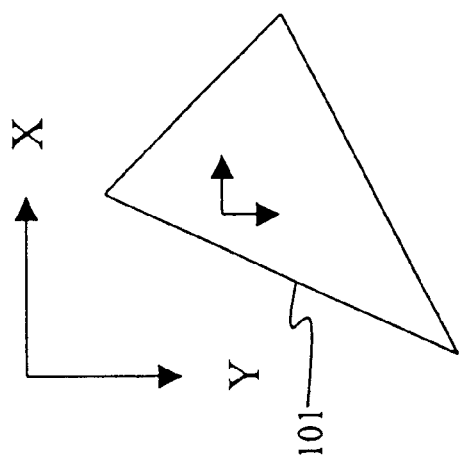
FIG. 1

301: The available $(X_1, Y_1, S_1, T_1, W_1)$, $(X_2, Y_2, S_2, T_2, W_2)$ and $(X_3, Y_3, S_3, T_3, W_3)$ for the three vertices of the triangle are used to solve equations(2)-(4) and determine the constants $A_{SOW}$, $B_{SOW}$, $A_{TOW}$, $B_{TOW}$, $A_{OOW}$ and $B_{OOW}$ 302: Eq. (1) is converted to an equivalent formula for the multiple levels of detail shown in Eq. (5) by means of the relationship between the partial differentials of the texture mapping $(S,T)$ relative to the $(X,Y)$ coordinate and the equations(2)-(4)

303: Finding the $\log_2$ function from a look-up table as shown in FIG. 4

FIG.3

| X(binary) | X(decimal) | LOG2X(decimal) | LOG2X(binary) | LOG2X(hex) |
|---|---|---|---|---|
| 1.000 | 1.000 | 0.000000000000 | 0.000000000000 | 0.000 |
| 1.001 | 1.125 | 0.169925001442 | 0.001010101110 | 0.0ae |
| 1.010 | 1.250 | 0.321928094887 | 0.010100011001 | 0.149 |
| 1.011 | 1.375 | 0.459431618638 | 0.011101010110 | 0.1d6 |
| 1.100 | 1.500 | 0.584962500721 | 0.100101010111 | 0.257 |
| 1.101 | 1.625 | 0.700439718141 | 0.101100111101 | 0.2cd |
| 1.110 | 1.750 | 0.807354922058 | 0.110011101010 | 0.33a |
| 1.111 | 1.875 | 0.906890595608 | 0.111010100000 | 0.3a0 |

FIG. 4

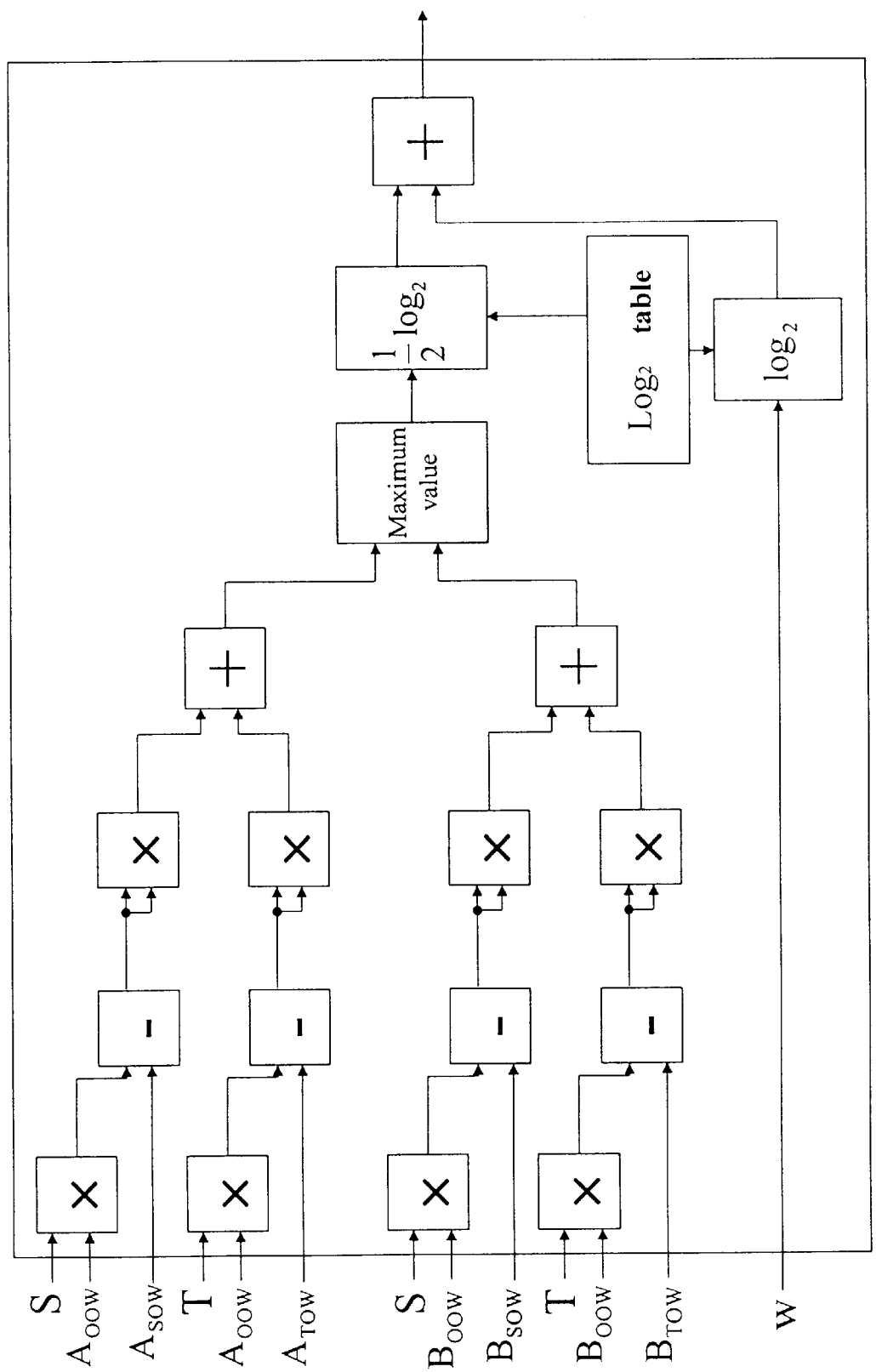
F I G. 5

APPARATUS AND METHOD FOR TEXTURE MAPPING USING MULTIPLE LEVELS OF DETAIL

FIELD OF THE INVENTION

The present invention relates generally to texture mapping of three-dimensional computer graphics, and more particularly to an apparatus and method for texture mapping using multiple levels of detail.

BACKGROUND OF THE INVENTION

An object image of full resolution can be pre-filtered and represented by a number of primitive objects or simple textures with lower resolution. The simple textures can then be drawn according to its geometric coordinates. The process of converting a high resolution object image into low resolution simple textures is called mipmapping. Mipmapping technique has been used in texture mapping for three dimensional computer graphics. A texture can be described as a single pixel, an element, two elements, three elements or four elements.

Mipmapping technique selects proper textures for describing a primitive object based on functions of multiple levels of detail. The textures are processed in order to accurately describe the primitive object. FIG. 1 illustrates the process of a conventional mipmapping technique for texture mapping of a primitive object. The primitive object a 101 which is a triangle in FIG. 1 is shown in a X-Y coordinate system. The texture 102 is shown in a S-T coordinate system. The texture mapping 103 is drawn after mipmapping according to a function of multiple levels of detail.

For each pixel at (X, Y) in the X-Y coordinate system with corresponding texture coordinate (S, T) in the S-T coordinate system, the multiple levels of detail (LOD) is defined in Eq. (1):

$$d = LOD = \log_2\left(\max\left(\sqrt{\left(\frac{\partial S}{\partial X}\right)^2 + \left(\frac{\partial T}{\partial X}\right)^2}, \sqrt{\left(\frac{\partial S}{\partial Y}\right)^2 + \left(\frac{\partial T}{\partial Y}\right)^2}\right)\right) \quad (1)$$

where $\partial S/\partial X$ is the partial differential of S with respect to X, $\partial T/\partial X$ is the partial differential of T with respect to X, $\partial S/\partial Y$ is the partial differential of S with respect to Y, and $\partial T/\partial Y$ is the partial differential of T with respect to Y.

Because it is difficult to realize the above multiple levels of detail shown in Eq. (1) with hardware for each pixel, conventional mipmapping technique usually uses modified approach to compute the multiple levels of detail. For example, in three dimensional computer graphics software or chips, certain values for constant levels of detail for a primitive object are found first. Interpolation technique is then used to fill in more values and improves the resolution. During the interpolation, perspective correction may or may not be applied.

FIG. 2 shows pre-filtered images generated in the texture mapping of a primitive object using mipmapping technique. The values d for the multiple levels of detail shown in the figure are 0, 1, 2, ..., etc. The size of the pre-filtered image is identical to that of the original texture when d is equal 0. If the value d is 1, the size of the pre-filtered image is reduced to ¼. If the value d is 2, the size is reduced to ¹⁄₁₆. If the value is 3, the size is reduced to ¹⁄₆₄, and so on.

The conventional mipmapping technique has drawback as well as difficulty in its implementation. The difficulty is that the conventional technique requires the use of a monotonically increasing function f(x,y) which has continuous $|\partial S/\partial X|$, $|\partial T/\partial X|$, $|\partial S/\partial Y|$ and $|\partial T/\partial Y|$ to find the approximate value of Eq. (1). And, in fact, it is not easy to realize the function f(x,y). The drawback is poor quality in the resulted texture mapping. The effect of simulating the real object is not good either.

SUMMARY OF THE INVENTION

The present invention has been made to overcome the above mentioned drawback and difficulty in the texture mapping of three dimensional computer graphics. The primary object of the invention is to provide a method and apparatus for a texture mapping technique using multiple levels of detail. According to the invention, appropriate texture mapping is selected according to the viewing distance from the original object.

Another object of the invention is to provide a method and apparatus for texture mapping in which each pixel can be realized with hardware according to a special equation disclosed in the present invention. The primitive object is represented by a triangle. By using available and useful data of the three vertices of a triangle and the equation that represents the plane of the triangle, the standard formula Eq. (1) describing multiple levels of detail is converted into an equivalent formula. The texture mapping using the equivalent formula can be easily implemented by hardware.

A further object of the invention is to provide a method and apparatus for texture mapping that can result in high accuracy and optimal simulation effect of the original object. According to a preferred embodiment of the present invention, the computation of a $\log_2(x)$ function that is required in computing the equivalent formula of this invention is achieved by using a $\log_2$ look-up table. The first three bits of the mantissa of a value x are used as the index to the $\log_2$ look-up table in order to find the fractional part of the logarithmic value which has 10 binary bits precision.

The foregoing and other objects, features, aspects and advantages of the present invention will become more apparent from a careful reading of a detailed description provided herein below, with appropriate reference to the accompanying drawings.

BRIEF DESCRIPTION OF THE DRAWINGS

FIG. 1 illustrates the texture mapping of a primitive object using a conventional mipmapping technique.

FIG. 3 illustrates the flow chart of the texture mapping using multiple levels of detail technique according to the present invention.

FIG. 4 shows a table of $\log_2(x)$ function wherein the first 3 bits of the mantissa of a x value are used as the index to the table for finding the fractional part of the logarithmic value.

FIG. 5 shows a preferred embodiment of a hardware implementation of an equivalent formula that computes the texture mapping using multiple levels of detail of this invention.

DETAILED DESCRIPTION OF THE PREFERRED EMBODIMENTS

Figure 2:
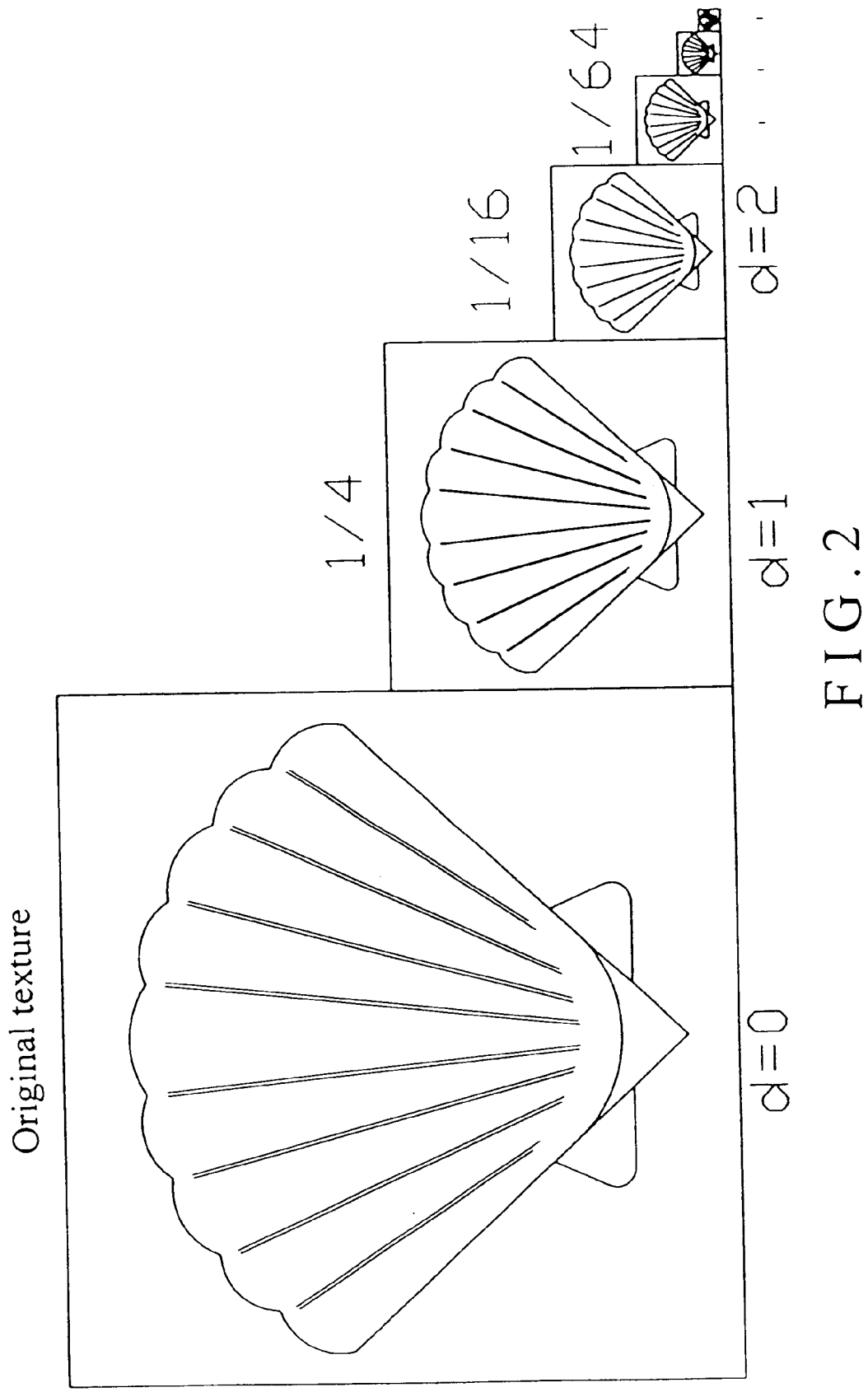
FIG. 2 illustrates the pre-filtered textures with different multiple levels of detail in the texture mapping of a primitive object using a conventional mipmapping technique.

The symbols and coordinate system used in the following description are defined first for convenience. In a three dimensional graphics, a texture coordinate computed for a primitive object with perspective correction W is represented by (S, T, W). The computation is normally based on three values, i.e., S/W, T/W and 1/W. Symbols SOW, TOW and OOW are used to represent these three values respectively.

The three values SOW, TOW and OOW have linear relationship with respect to the equation $f(X, Y) = AX + BY + C$ of the plane that contains the triangle representing the primitive object. In other words, the three values must satisfy the following three equations:

$$S/W = SOW = A_{SOW}X + B_{SOW}Y + C_{SOW} \quad (2)$$

$$T/W = TOW = A_{TOW}X + B_{TOW}Y + C_{TOW} \quad (3)$$

$$1/W = OOW = A_{OOW}X + B_{OOW}Y + C_{OOW} \quad (4)$$

where $A_{SOW}$, $B_{SOW}$, $C_{SOW}$, $A_{TOW}$, $B_{TOW}$, $C_{TOW}$, $A_{OOW}$, $B_{OOW}$ and $C_{OOW}$ are constants.

In the following paragraphs, the equation of the multiple levels of detail of this invention and how to perform the texture mapping will be described. FIG. 3 illustrate the flow diagram of an embodiment of this invention. In the first step 301, the available data $(X_1, Y_1, S_1, T_1, W_1)$, $(X_2, Y_2, S_2, T_2, W_2)$ and $(X_3, Y_3, S_3, T_3, W_3)$ for the three vertices of the triangle are used to solve equations (2)–(4) and determine the constants $A_{SOW}$, $B_{SOW}$, $A_{TOW}$, $B_{TOW}$, $A_{OOW}$, and $B_{OOW}$ as follows:

$$A_{SOW} = \frac{(SOW_1 - SOW_3)(Y_2 - Y_3) - (SOW_2 - SOW_3)(Y_1 - Y_3)}{(X_1 - X_3)(Y_2 - Y_3) - (X_2 - X_3)(Y_1 - Y_3)}$$

$$B_{SOW} = \frac{(X_1 - X_3)(SOW_2 - SOW_3) - (X_2 - X_3)(SOW_1 - SOW_3)}{(X_1 - X_3)(Y_2 - Y_3) - (X_2 - X_3)(Y_1 - Y_3)}$$

$$A_{TOW} = \frac{(TOW_1 - TOW_3)(Y_2 - Y_3) - (TOW_2 - TOW_3)(Y_1 - Y_3)}{(X_1 - X_3)(Y_2 - Y_3) - (X_2 - X_3)(Y_1 - Y_3)}$$

$$B_{TOW} = \frac{(X_1 - X_3)(TOW_2 - TOW_3) - (X_2 - X_3)(TOW_1 - TOW_3)}{(X_1 - X_3)(Y_2 - Y_3) - (X_2 - X_3)(Y_1 - Y_3)}$$

$$A_{OOW} = \frac{(OOW_1 - OOW_3)(Y_2 - Y_3) - (OOW_2 - OOW_3)(Y_1 - Y_3)}{(X_1 - X_3)(Y_2 - Y_3) - (X_2 - X_3)(Y_1 - Y_3)}$$

$$B_{OOW} = \frac{(X_1 - X_3)(OOW_2 - OOW_3) - (X_2 - X_3)(OOW_1 - OOW_3)}{(X_1 - X_3)(Y_2 - Y_3) - (X_2 - X_3)(Y_1 - Y_3)}$$

where $SOW_1 = \frac{S_1}{W_1}$, $SOW_2 = \frac{S_2}{W_2}$, $SOW_3 = \frac{S_3}{W_3}$ $TOW_1 = \frac{T_1}{W_1}$, $TOW_2 = \frac{T_2}{W_2}$, $TOW_3 = \frac{T_3}{W_3}$ $OOW_1 = \frac{1}{W_1}$, $OOW_2 = \frac{1}{W_2}$, $OOW_3 = \frac{1}{W_3}$.

The step 302 shown in FIG. 3 is processed after constants $A_{SOW}$, $B_{SOW}$, $A_{TOW}$, $B_{TOW}$, $A_{OOW}$ and $B_{OOW}$ are found. In this step, Eq. (1) is converted to an equivalent formula for the multiple levels of detail shown in Eq. (5) by means of the relationship between the partial differentials of the texture mapping (S, T) relative to the (X, Y) coordinate and the equations (2)–(4). From Eqs. (2)–(4), because $$S = \frac{SOW}{OOW} \text{ and } T = \frac{TOW}{OOW},$$

the partial differential of S with respect to X can be derived as follows:

$$\frac{\partial S}{\partial X} = \frac{\partial}{\partial X}\left(\frac{SOW}{OOW}\right) = \left(\frac{\partial}{\partial X}SOW\right)\frac{1}{OOW} + \left(\frac{\partial}{\partial X}\frac{1}{OOW}\right)SOW$$

$$= A_{SOW}W - \frac{A_{OOW}}{OOW^2}SOW$$

$$= A_{SOW}W - A_{OOW}\frac{SOW}{OOW}\frac{1}{OOW}$$

$$= (A_{SOW} - A_{OOW}S)W,$$

Similarly, the following equations can be derived:

$$\frac{\partial T}{\partial X} = (A_{TOW} - A_{OOW}T)W,$$

$$\frac{\partial S}{\partial Y} = (B_{SOW} - B_{OOW}S)W, \text{ and}$$

$$\frac{\partial T}{\partial Y} = (B_{TOW} - B_{OOW}T)W.$$

Therefore, Eq. (1) can be rewritten as follows:

$$LOD = \log_2\left(\max\left(\sqrt{\left(\frac{\partial S}{\partial X}\right)^2 + \left(\frac{\partial T}{\partial X}\right)^2}, \sqrt{\left(\frac{\partial S}{\partial Y}\right)^2 + \left(\frac{\partial T}{\partial Y}\right)^2}\right)\right) \quad (5)$$

$$= \log_2\left(\max\left(\sqrt{((A_{SOW} - A_{OOW}S)W)^2 + ((A_{TOW} - A_{OOW}T)W)^2}, \sqrt{((B_{SOW} - B_{OOW}S)W)^2 + ((B_{TOW} - B_{OOW}T)W)^2}\right)\right)$$

$$= \log_2\left(\max\left(\sqrt{(A_{SOW} - A_{OOW}S)^2 + (A_{TOW} - A_{OOW}T)^2}, \sqrt{(B_{SOW} - B_{OOW}S)^2 + (B_{TOW} - B_{OOW}T)^2}\right)\right) + \log_2 W$$

$$= \frac{1}{2}\log_2(\max((A_{SOW} - A_{OOW}S)^2 + (A_{TOW} - A_{OOW}T)^2, (B_{SOW} - B_{OOW}S)^2 + (B_{TOW} - B_{OOW}T)^2)) + \log_2 W$$

where the function $\log_2$ has to be determined. Instead of computing the logarithmic function value, a look-up table can be used to obtain the value of the function. Step 303 is the step for finding the $\log_2$ function from a look-up table as shown in FIG. 4.

The value of a $\log_2(x)$ function can be represented by an exponent part and a fractional part as:

$\text{Log}_2(x) = \text{exponent part} \cdot \text{fractional part}$

According to the invention, the first three bits of the mantissa of a value x are used as the index to the $\log_2$ look-up table in order to find the fractional part of the logarithmic value which has 10 binary bits precision.

The multiple levels of detail of the present invention as shown in Eq. (5) can be implemented by hardware. A preferred embodiment of the implementation is shown in FIG. 5. With reference to Eq. (5), the circuit diagram in FIG. 5 has two groups of inputs. One is (S, $A_{OOW}$, $A_{SOW}$, T, $A_{OOW}$, $A_{TOW}$) and the other is (S, $B_{OOW}$, $B_{SOW}$, T, $B_{OOW}$, $B_{TOW}$). After four stages of computation, two data $(A_{SOW} - A_{OOW}S)^2 + (A_{TOW} - A_{OOW}T)^2$ and $(B_{SOW} - B_{OOW}S)^2 + (B_{TOW} - B_{OOW}T)^2$ are obtained according to the formula in Eq. (5). The maximum value of the two data are then determined. The following computation requires the use of the $\log_2$ table. After the $\log_2$ value of the maximum and the $\log_2$ value of another input Ware found from the look-up table, an adder is used to find the LOD value according to Eq. (5).

The present invention first derives an equivalent formula of a standard formula for multiple levels of detail and then discloses a circuit implementation. The hardware that implements the equivalent formula for the multiple levels of detail can be easily realized. In addition, the required $\log_2$ function values are obtained by a look-up table. The values in the look-up table have 10 binary bits accuracy. Therefore, the texture mapping according to this invention is very accurate. The quality of the texture is greatly improved and the simulation of the original object achieves good effect.

Figure 6:
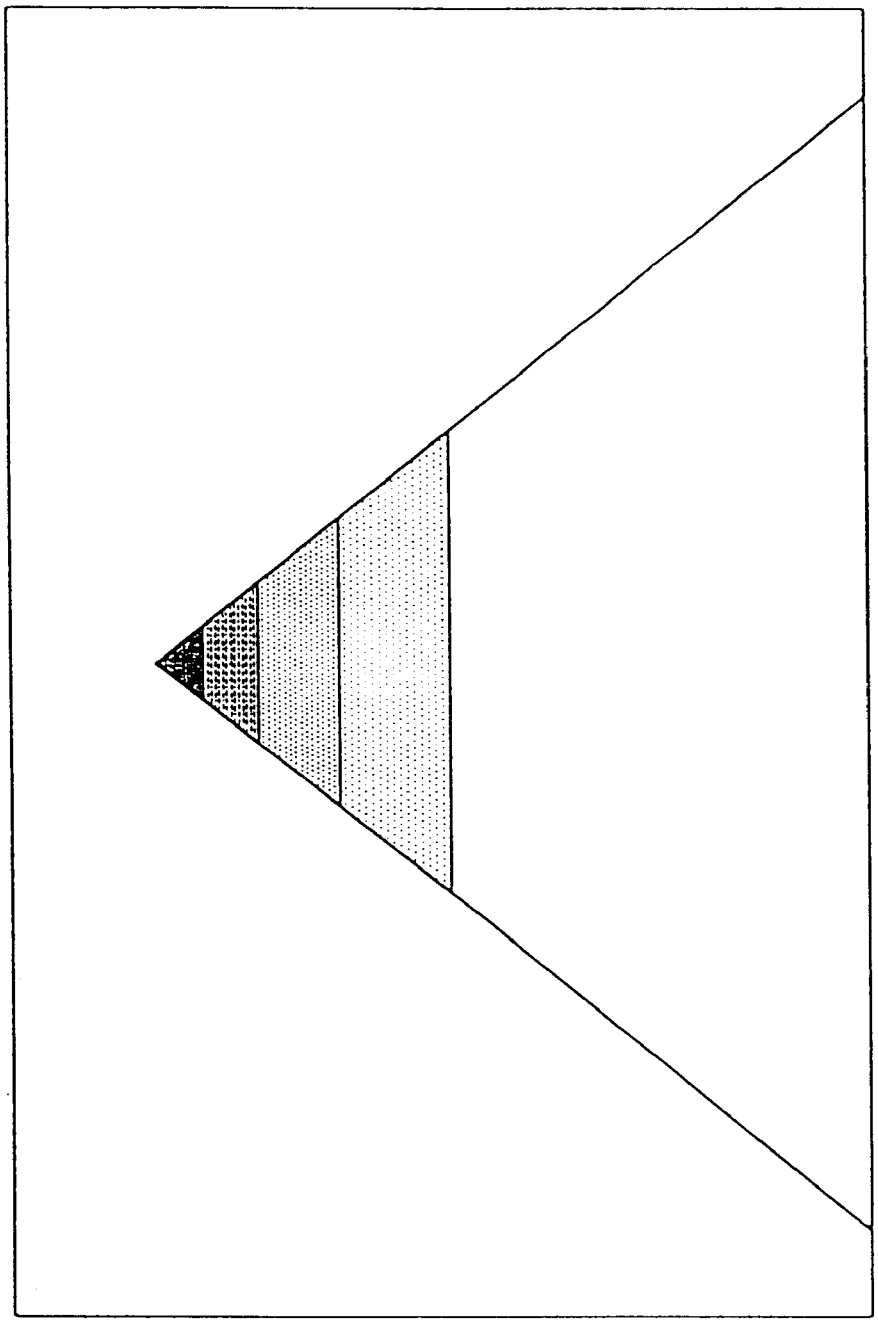
FIG. 6 illustrates texture mapping using different values for multiple levels of detail for a primitive object that is a long and deep avenue.
Figure 7A:
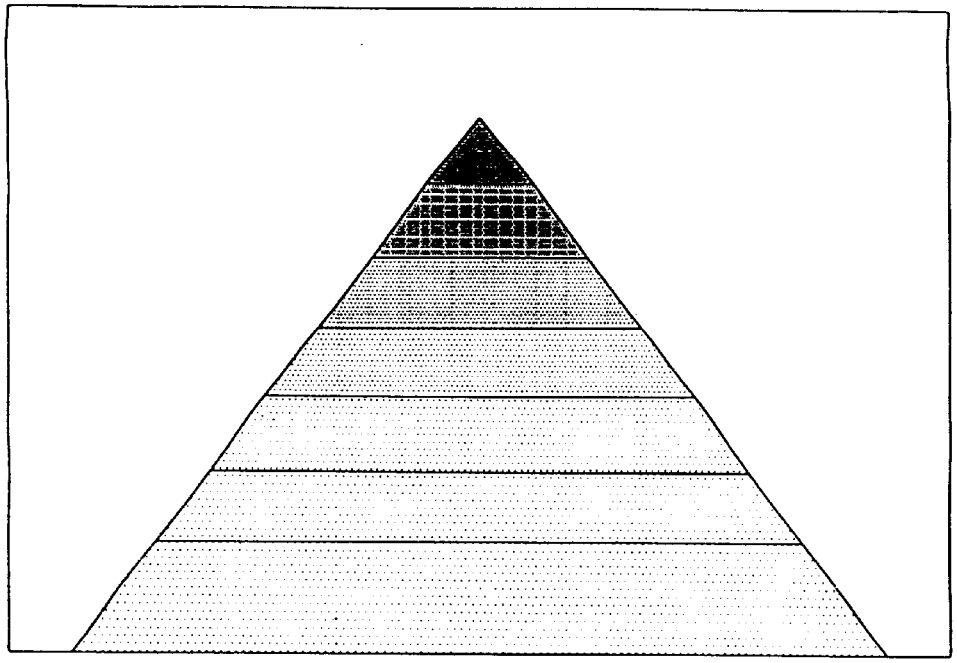
FIG. 7(a) illustrates texture mapping using a conventional mipmaping technique without perspective correction of the same primitive object in FIG. 6.
Figure 7B:
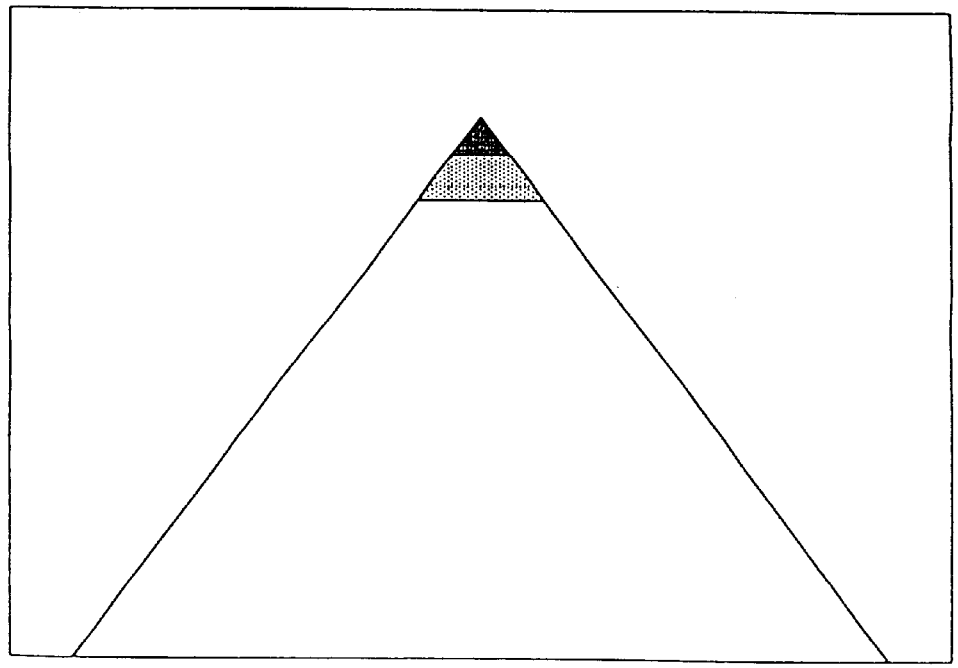
FIG. 7(b) illustrates texture mapping using a conventional mipmaping technique with perspective correction of the same primitive object in FIG. 6.

FIG. 6 illustrates an example of a texture mapping according to the present invention by means of multiple d values. The primitive object is a long and deep avenue. The results of the texture mapping using conventional mipmapping technique with and without perspective correction are shown in FIGS. 7(*a*) and 7(*b*) respectively. As can be seen, FIG. 7(*a*) can not show long and deep effect of the avenue. Although with perspective correction, FIG. 7(*b*) does show some effect of a long and deep avenue, it is not as faithful as the result shown in FIG. 6.

Although this invention has been described with a certain degree of particularity, it is to be understood that the present disclosure has been made by way of preferred embodiments only and that numerous changes in the detailed construction and combination as well as arrangement of parts may be restored to without departing from the spirit and scope of the invention as hereinafter set forth.

What is claimed is:

1. A method for computing multiple levels of detail for texture mapping of a triangle in three dimensional computer graphics, comprising the steps of:

representing each pixel in said triangle by (X, Y) in an X-Y coordinate, said triangle being on a plane having an equation f(X, Y)=AX+BY+C;

representing a texture mapped pixel of a pixel (X, Y) by (S, T) in an S-T coordinate;

preparing three data sets $(X_1, Y_1, S_1, T_1, W_1)$, $(X_2, Y_2, S_2, T_2, W_2)$, and $(X_3, Y_3, S_3, T_3, W_3)$ associated with three vertices $(X_1, Y_1)$, $(X_2, Y_2)$ and $(X_3, Y_3)$, three corresponding texture mapped pixels $(S_1, T_1)$, $(S_2, T_2)$ and $(S_3, T_3)$, and three corresponding perspective correction factors $W_1$, $W_2$, and $W_3$;

determining three constants $A_{SOW}$, $B_{SOW}$, $A_{TOW}$, $B_{TOW}$, $A_{OOW}$ and $B_{OOW}$ by using said three data sets for solving three equations:

$$A_{SOW}X + B_{SOW}Y + C_{SOW} = \frac{S}{W}$$

$$A_{TOW}X + B_{TOW}Y + C_{TOW} = \frac{T}{W}$$

$$A_{OOW}X + B_{OOW}Y + C_{OOW} = \frac{1}{W};$$

substituting constants $A_{SOW}$, $B_{SOW}$, $A_{TOW}$, $B_{TOW}$, $A_{OOW}$ and $B_{OOW}$ into a formula for computing multiple levels of detail defined as $$\frac{1}{2}\log_2(\max((A_{SOW} - A_{OOW}S)^2 + (A_{TOW} - A_{OOW}T)^2,$$
$$(B_{SOW} - B_{OOW}S)^2 + (B_{TOW} - B_{OOW}T)^2)) + \log_2 W,$$

to select an appropriate level of detail for texture mapping, wherein W is a perspective correction factor, max is an operator for finding the larger value of two values, and $\log_2$ is a 2-based logarithmic operator.

2. The method according to claim 1, wherein a $\log_2(x)$ function value of a variable x is obtained by preparing a lookup table and using x as an index for looking up the $\log_2(x)$ value.

3. The method according to claim 2, wherein said lookup table comprises fractional parts of $\log_2(x)$ function values each having 10 binary bits precision and the index is formed by the first three bits of the mantissa of a variable x.

4. An apparatus for implementing the method for computing multiple levels of detail according to claim 1, comprising:

a first sum-of-squares unit having $A_{SOW}$, $A_{OOW}$, $A_{TOW}$, S and T as inputs for computing a first sum of squares $(A_{SOW}-A_{OOW}S)^2+(A_{TOW}-A_{OOW}T)^2$, a second sum-of-squares unit having $B_{SOW}$, $B_{OOW}$, $B_{TOW}$, S and T as inputs for computing a second sum of squares $(B_{SOW}-B_{OOW}S)^2+(B_{TOW}-B_{OOW}T)^2$, a comparison unit receiving said first sum of squares and said second sum of squares and outputting the larger one of said first and second sums of squares;

a first $\log_2$ function computing unit receiving said larger one and computing a first value equal to a half of a 2-based logarithmic value of said larger one;

a second $\log_2$ function computing unit having W as an input and computing a second value equal to a 2-based logarithmic value of W; and an adder summing said first and second values and outputting a value for level of detail.

5. The apparatus according to claim 4, said first and second sum-of-squares units each comprising four multipliers and two subtractors for computing said first and second sums of squares.

6. The apparatus according to claim 4, wherein said first and second $\log_2$ function computing units determine 2-based logarithmic values by using a variable x as an index for determining a $\log_2(x)$ function value from a lookup table.

* * * * *